March 21, 1939. E. PASCUCCI 2,151,279
REFLECTING UNIT
Filed May 25, 1934 2 Sheets-Sheet 1
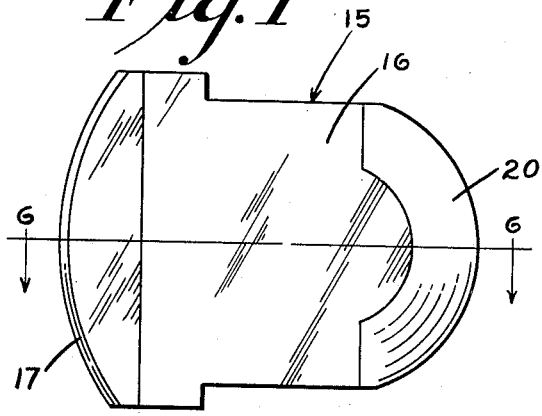
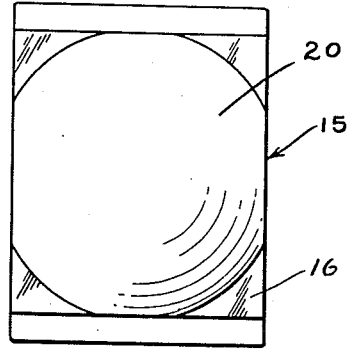
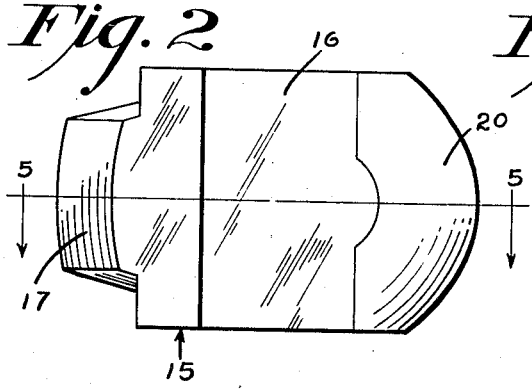
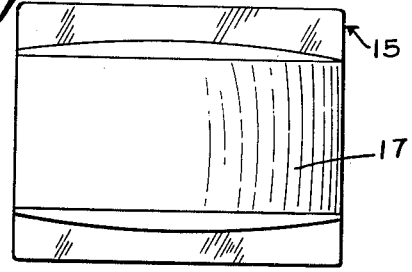
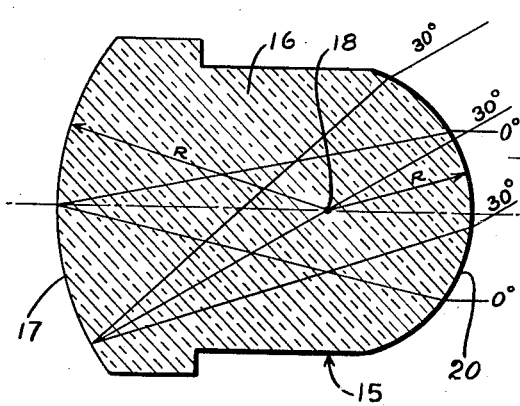
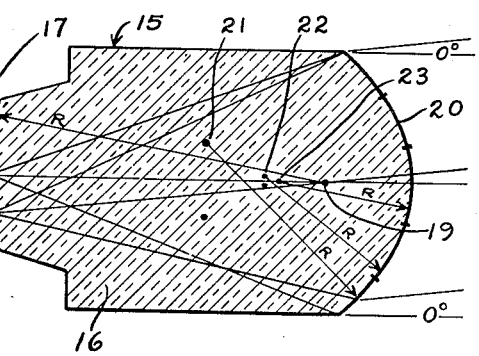
INVENTOR.
EMILIO PASCUCCI
BY Dorsey Cole
ATTORNEYS.

March 21, 1939.　　　E. PASCUCCI　　　2,151,279
REFLECTING UNIT
Filed May 25, 1934　　　2 Sheets-Sheet 2
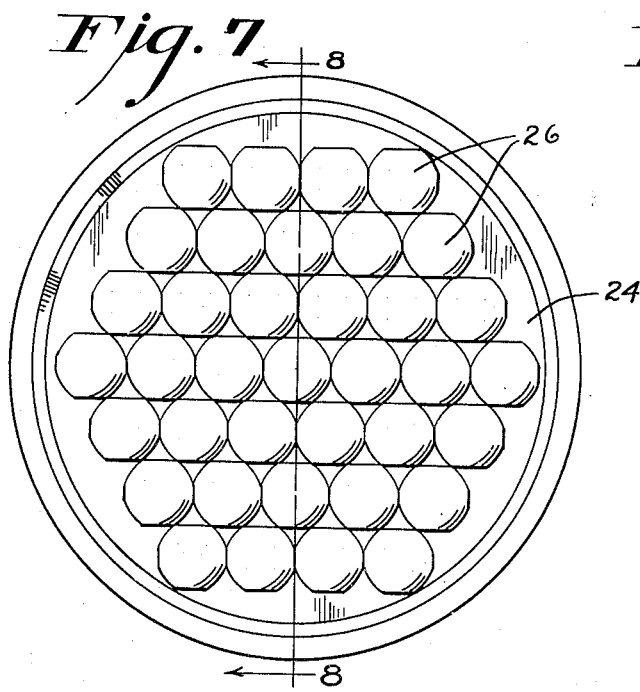
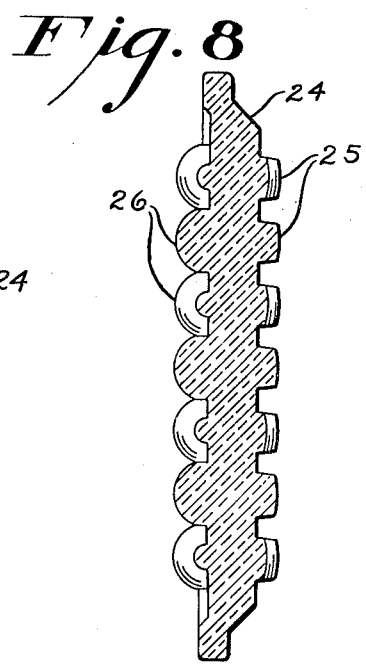
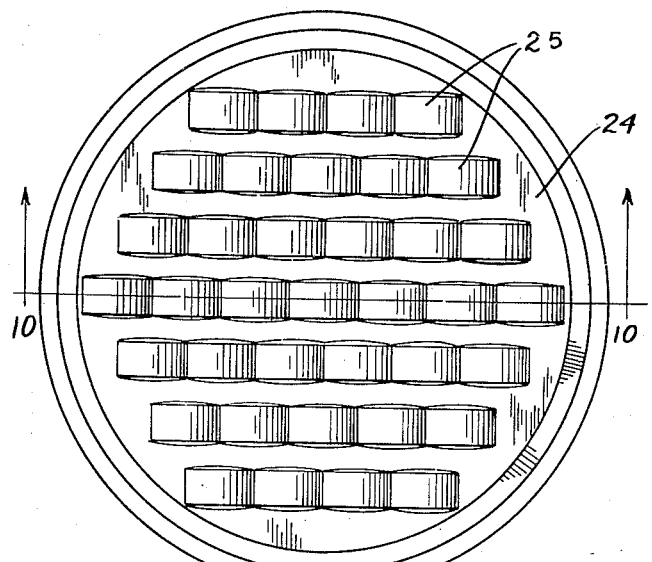
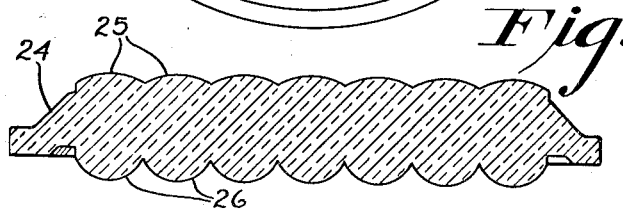
INVENTOR.
EMILIO PASCUCCI
ATTORNEYS.

Patented Mar. 21, 1939

2,151,279

UNITED STATES PATENT OFFICE 2,151,279

REFLECTING UNIT

Emilio Pascucci, Corning, N. Y., assignor to Corning Glass Works, Corning, N. Y., a corporation of New York Application May 25, 1934, Serial No. 727,536

1 Claim. (Cl. 88—82)

This invention relates to reflecting units, and more particularly to the type of unit ordinarily referred to as reflex signal units.

Reflex signal units in recent years have found wide applications in signalling, particularly as route markers, highway traffic signs, and the like. More recently they have been adopted for use in railway signalling, particulary for switch lamps, due to the economies which have been effected through the elimination of the maintenance which necessarily accompanies the use of oil and electric lamps.

Reflex signals necessarily depend for their proper functioning on the return of the light along the same path in which it originally travels when emitted from a light source, and consequently great accuracy of the optical system of the reflex units is necessary for efficient operation. This is particularly essential in railway signalling as maximum efficiency must be maintained in order to avoid creating hazards which may result in great loss of life and property.

It is well known that optical systems employing spherical surfaces suffer, at least to some extent, from spherical aberration and consequently reflex units have been formed with aspheric objective faces. While such units function admirably when the light is projected axially on their objective faces, their efficiency is seriously affected when the light is projected upon them from an angle even a few degrees off their axes. Consequently, when a light projector is mounted on a moving vehicle, the return from a reflex unit having an aspheric face will be excellent so long as the vehicle is far enough away to cause the light to strike the system substantially axially, but as the signal is approached and the angle at which the light strikes the aspheric face increases, the light returned from the signal rapidly diminishes to such an extent as to render the signal practically useless.

The object of the present invention is to increase the efficiency of reflex signal units.

The above and other objects may be accomplished by employing my invention, which embodies among its features a concave reflecting face and an involute objective face which focuses parallel light rays on the concave face and is circular throughout one section and aspheric throughout a section at right angles thereto.

In the drawings

Fig. 1 is a plan view of a reflex button constructed in accordance with my invention;

Fig. 2 is a side view of Fig. 1;

Fig. 3 is a front view of Fig. 1;

Fig. 4 is a rear view of Fig. 1;

Fig. 5 is a sectional view taken on the line 5—5 of Fig. 2;

Fig. 6 is a sectional view taken on the line 6—6 of Fig. 1;

Fig. 7 is a front view of a reflex panel embodying my invention;

Fig. 8 is a sectional view taken on the line 8—8 of Fig. 7;

Fig. 9 is a rear view of the panel shown in Fig. 7; and

Fig. 10 is a sectional view taken on the line 10—10 of Fig. 9.

Referring to the drawings in detail, a reflex unit, designated generally 15, comprises a solid glass body 16 which is rectangular in cross section and provided at one end with a simple toric convex face 17, which through one section follows a circular contour, which is struck from a center 18 (Fig. 5) on the axis of the body 16 and through a section at right angles thereto follows a circular contour which is struck from a center 19 (Fig. 6) on the axis of the body 16. The face 17 is silvered or otherwise provided with a suitable reflecting coat to form a toric concave reflecting surface 25 on the rear end of the unit. Formed on the opposite end of the body 16 is an involute convex objective face 20, which is so positioned with relation to the face 17 that parallel light rays projected on the face 20 will be brought to a focus on the reflecting surface.

As shown in Fig. 5, the face 20 follows a uniformly circular curve throughout one section, which curve is struck from the center 18 on the axis of the unit, while the section at right angles to that struck from the center 18 is aspheric, and follows an arcuate contour which is struck from a series of centers 21, 22 and 23, which are so positioned that the aspheric curve of the face 20 will bring parallel light, which is projected upon it axially, to a focus in vertical section on the concave reflector formed on the face 17.

Since the aspheric surface of the involute face 20 will function only through a relatively small angle off of the axis, I preferably dispose it in such a position in the signal that it will be subjected to rays projected from angles but little off the axis and hence, for ordinary signalling use, I prefer that the reflex unit be so positioned that its objective face is aspheric in vertical section. This then disposes the circular section of the objective face horizontally so that the signal will be visible to the driver of an approaching vehicle throughout all angles up to 90° and, due to the correction of the spherical aberration in at least one direction, a much stronger light return from the signal is experienced than where a wholly aspheric or wholly spherical objective surface is employed.

In the modification disclosed in Figs. 7 to 10 inclusive, I employ a plate 24 of transparent material, on one side of which I provide simple toric reflecting faces 25 and on its opposite side I provide involute objective faces 26 which are disposed in axial alignment with and at the proper focal distance from the reflecting faces 25. Like the involute face 20, the faces 26 are aspheric throughout certain sections and circular throughout their sections at right angles to the aspheric sections, and I prefer that all of the circular sections lie parallel, though in some instances it may be found desirable to so construct the signal that alternate faces or rows of faces will be circular and aspheric respectively in the horizontal; hence various combinations and arrangements of the faces may be employed to suit different conditions and requirements.

While in the foregoing there has been shown and described the preferred embodiment of my invention in which I employ a toric reflecting surface, it is to be understood that I may, in devices requiring less accuracy, use a spherical reflector without departing from the spirit and scope of my invention as claimed.

What I claim is:

An autocollimating reflex device comprising a refracting objective portion having a convex objective face which is of aspheric curvature in a section thereof on a plane containing the longitudinal axis of the device and of circular curvature in a section on a plane at right angles to the first plane and also containing the said axis, the principal focus of the aspheric curvature being coincident with the principal focus of the circular curvature, and a reflective portion having its reflecting surface in the said second section curved concentrically with the circular curvature of the objective face at a distance behind the objective face measured along the longitudinal axis of the device such that the reflective surface contains the said coincident foci.

EMILIO PASCUCCI.